(12) United States Patent
Yun et al.

(10) Patent No.: US 11,356,652 B2
(45) Date of Patent: Jun. 7, 2022

(54) STEREOSCOPIC IMAGE GENERATING APPARATUS, STEREOSCOPIC IMAGE RECONSTRUCTING APPARATUS AND STEREOSCOPIC IMAGE PLAYING SYSTEM INCLUDING SAME

(71) Applicants: IMMERSIVECAST CO., LTD., Seoul (KR); Hong Seo Yun, Incheon (KR)

(72) Inventors: Hong Seo Yun, Incheon (KR); Jang Hee Han, Seongnam-si (KR)

(73) Assignees: IMMERSIVECAST CO., LTD., Seoul (KR); Hong Seo Yun, Incheon (KR)

( * ) Notice: Subject to any disclaimer, the term of this patent is extended or adjusted under 35 U.S.C. 154(b) by 0 days.

(21) Appl. No.: 17/253,108

(22) PCT Filed: Dec. 2, 2019

(86) PCT No.: PCT/KR2019/016836
§ 371 (c)(1),
(2) Date: Dec. 16, 2020

(87) PCT Pub. No.: WO2020/130416
PCT Pub. Date: Jun. 25, 2020

(65) Prior Publication Data
US 2021/0274155 A1   Sep. 2, 2021

(30) Foreign Application Priority Data

Dec. 19, 2018 (KR) .......................... 10-2018-0164854

(51) Int. Cl.
*H04N 13/00* (2018.01)
*H04N 13/344* (2018.01)
(Continued)

(52) U.S. Cl.
CPC ......... *H04N 13/344* (2018.05); *H04N 13/383* (2018.05); *H04N 13/398* (2018.05)

(58) Field of Classification Search
CPC .. H04N 13/344; H04N 13/383; H04N 13/398; H04N 13/00; H04N 13/117;
(Continued)

(56) References Cited

U.S. PATENT DOCUMENTS

2012/0002022 A1* 1/2012 Ohgose ................ H04N 13/189
348/51
2012/0268572 A1* 10/2012 Cheng .................. H04N 13/133
348/49

(Continued)

FOREIGN PATENT DOCUMENTS

JP    2008-092390 A    4/2008
KR   10-0813435 B1    3/2008
(Continued)

OTHER PUBLICATIONS

International Search Report for PCT/KR2019/016836 dated Mar. 6, 2020 from Korean Intellectual Property Office.

*Primary Examiner* — Gims S Philippe
(74) *Attorney, Agent, or Firm* — Revolution IP, PLLC

(57) ABSTRACT

A stereoscopic image generating apparatus includes a FOV processor configured to receive head and body movements of a user mounted with a Head Mount Display (HMD) device and a Virtual Reality (VR) Vest device, a first eye image generating unit including an intra image independently generated for a first eye and an inter image derived from the intra image and configured to generate a redundant image up to a redundant angle of view greater by a specific criterion or more than a real angle of view which is currently displayed in a direction of the first eye from a center of the head direction of a user as a plurality of first eye images, and a second eye image generating unit configured to generate a plurality of second eye images based on the intra image among the plurality of first eye images for the second eye.

8 Claims, 8 Drawing Sheets

(51) Int. Cl.
*H04N 13/383* (2018.01)
*H04N 13/398* (2018.01)

(58) Field of Classification Search
CPC .. H04N 13/167; H04N 13/332; H04N 13/371; H04N 2013/0096; G06T 5/00; G06T 5/001
USPC .......................................................... 348/52
See application file for complete search history.

(56) References Cited

U.S. PATENT DOCUMENTS

| | | | |
|---|---|---|---|
| 2013/0114705 | A1 | 5/2013 | Chen et al. |
| 2013/0215223 | A1* | 8/2013 | Mochizuki ........... H04N 19/597 348/43 |
| 2013/0215224 | A1* | 8/2013 | Mochizuki ........... H04N 19/103 348/43 |
| 2013/0235152 | A1 | 9/2013 | Hannuksela et al. |
| 2018/0120932 | A1* | 5/2018 | Sengelaub ......... G06K 9/00604 |
| 2018/0307044 | A1 | 10/2018 | Oh et al. |

FOREIGN PATENT DOCUMENTS

| | | |
|---|---|---|
| KR | 10-0820132 B1 | 4/2008 |
| KR | 10-2010-0072776 A | 7/2010 |
| KR | 10-2014-0064926 A | 5/2014 |
| KR | 10-2018-0117770 A | 10/2018 |

\* cited by examiner

STEREOSCOPIC IMAGE GENERATING APPARATUS, STEREOSCOPIC IMAGE RECONSTRUCTING APPARATUS AND STEREOSCOPIC IMAGE PLAYING SYSTEM INCLUDING SAME

CROSS REFERENCE TO PRIOR APPLICATIONS

This application is a National Stage Application of PCT International Patent Application No. PCT/KR2019/016836 filed on Dec. 2, 2019, under 35 U.S.C. § 371, which claims priority to Korean Patent Application No. 10-2018-0164854 filed on Dec. 19, 2018, which are all hereby incorporated by reference in their entirety.

BACKGROUND OF THE DISCLOSURE

Field of the disclosure

The present disclosure relates to a stereoscopic image generation and reconstruction technology, and more particularly, to a stereoscopic image generating apparatus capable of reducing or eliminating unnecessary operations in a reproduction environment of a stereoscopic image, a stereoscopic image reconstructing apparatus, and a stereoscopic image playing system including the same.

Related Art

Recently, Virtual Reality (VR) devices are emerging, but they are not widely used as smartphones because of problems such as expensive price, low resolution that hinders immersion, lack of VR content, and the like. Particularly, solution of physical inconvenience such as dizziness caused by discrepancies between the user's head movement and VR image visible to an eye may be an issue that must be solved essentially. In order to solve this problem, a Motion-to-Photon (MTP) Redundancy needs to be reduced to 10 to 20 ms, and there is a technical difficulty in achieving this in a wireless environment (e.g., WiFi or mobile network, etc.).

Korean Registered Patent No. 10-0820132 (Apr. 1, 2008) relates to a method and system for estimating picture intra-prediction mode and transmission and organization, and discloses a technique capable of improving an efficiency of coding process by providing a method and system for estimating a pixel prediction mode used in an image encoding or decoding process, transmitting the pixel prediction mode between an image encoder and a decoder, and ordering an intra-prediction mode of a pixel.

Korean Registered Patent No. 10-0813435 (Mar. 7, 2008) relates to a method and apparatus for encoding/decoding a bitstream, and discloses a technique for decoding a bitstream encoded by various formats (syntax, semantics) according to each standard (e.g., MPEG-1, MPEG-2, MPEG-4, MPEG-4 AVC, etc.), and generating an extended bitstream by adding decoding description therefor.

PRIOR ART DOCUMENT

Patent Document

Korean Registered Patent No. 10-0820132 (Apr. 1, 2008)
Korean Registered Patent No. 10-0813435 (Mar. 7, 2008)

SUMMARY OF THE DISCLOSURE

An embodiment of the present disclosure provides a stereoscopic image generating apparatus capable of reducing or eliminating unnecessary operations in a playing environment of a stereoscopic image, a stereoscopic image reconstructing apparatus and a stereoscopic image playing system including the same.

An embodiment of the present disclosure provides a stereoscopic image generating apparatus, a stereoscopic image reconstructing apparatus, and a stereoscopic image playing system including the same, which can effectively reduce data transmitted through wireless communication by utilizing an intra image of a right image as a basic inter image generation of a left image.

An embodiment of the present disclosure provides a stereoscopic image generating apparatus, a stereoscopic image reconstructing apparatus, and a stereoscopic image playing system including the same, capable of synchronizing an intra picture of a right image with a basic inter picture of a left image at the same time.

In one embodiment, a stereoscopic image generating apparatus includes a FOV processor configured to receive head and body movements of a user mounted with a Head Mount Display (HMD) device and a Virtual Reality (VR) Vest device, a first eye image generating unit including an intra image independently generated for a first eye and an inter image derived from the intra image and configured to generate a redundant image up to a redundant angle of view greater by a specific criterion or more than a real angle of view which is currently displayed in a direction of the first eye from a center of the head direction of a user as a plurality of first eye images, and a second eye image generating unit configured to generate a plurality of second eye images based on the intra image among the plurality of first eye images for the second eye.

The FOV processor may determine the FOV related to horizontal and vertical based on an acceleration of the head and body movements of the user.

The second eye image generating unit may generate a plurality of second eye images including a basic inter image generated based on the intra image and an expanded inter image derived from the basic inter image.

The first eye image generating unit may perform Foveated Rendering for the redundant image and increases a resolution for a real image up to the actual angle of view, when a head direction of the user is maintained for a predetermined time or more.

The second eye image generating unit may synchronize the intra image and the basic inter image on a same time in a stereoscopic image.

The second eye image generating unit may generate a difference between an intra image (hereinafter, first intra image) independently generated for the first eye and an intra image (hereinafter, second intra image) independently generated for the second eye as the basic inter image.

In one embodiment, a stereoscopic image reconstructing apparatus includes a first eye image reconstructing unit configured to sequentially receive a plurality of first eye images including an intra image independently generated for a first eye and an inter image derived from the intra image to reconstruct the first eye image, and a second eye image reconstructing unit configured to sequentially receive a plurality of second eye images including a basic inter image generated based on the intra image among the plurality of the first eye images and an expanded inter image derived from the basic inter image for the second eye to reconstruct the second eye image.

In one embodiment, a stereoscopic image playing system includes a stereoscopic image reconstructing apparatus including a first eye image reconstructing unit configured to sequentially receive a plurality of first eye images including an intra image independently generated for a first eye and an inter image derived from the intra image to reconstruct the first eye image and a second eye image reconstructing unit configured to sequentially receive a plurality of second eye images including a basic inter image generated based on the intra image among the plurality of the first eye images and an expanded inter image derived from the basic inter image for the second eye to reconstruct the second eye image, and a Head Mount Display (HMD) device configured to receive the plurality of first and second eye images and display the stereoscopic image.

DESCRIPTION OF EXEMPLARY EMBODIMENTS

Figure 1:
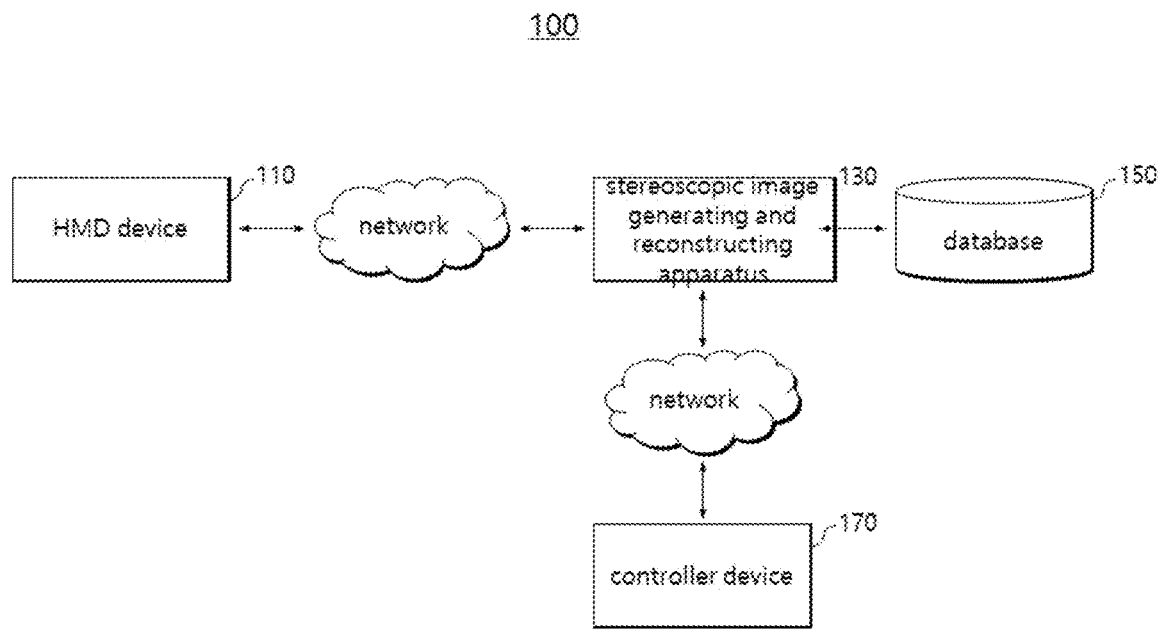
FIG. 1 is a diagram illustrating a stereoscopic image generating and playing system according to an embodiment of the present disclosure.

The description of the present disclosure is merely exemplary embodiments for structural and functional descriptions. This present disclosure should not be construed as limited to the embodiments set forth herein. That is, since the embodiments may have various modifications and variations, it is understood that the scope of the present disclosure includes equivalences that implement the technical concept. In addition, a specific embodiment should include all the proposed objects or effects or include only the effects, and accordingly, it should not be understood that the scope of the present disclosure is limited thereby.

Meanwhile, the terms described in the present application should be understood as follows.

The terms "first" and "second" are used to distinguish one element from another element, and the scope of the present disclosure should not be limited by these terms. For example, a first element may also be referred to as a second element, and similarly, a second element may also be referred to as a first element.

It will be understood that when an element is referred to as being "connected" to another element, it may be directly connected the other element, or it will be understood that an element may exist therebetween. However, when an element is referred to as being "directly connected" to another element, it will be understood that there is no element therebetween. Meanwhile, other expressions describing a relation between elements, that is, "between~", "directly between~", "neighboring~", "adjacent to~", and the like should be interpreted in the same way.

A singular expression should be interpreted that the singular expression includes a plural expression unless it does not mean otherwise in the context. And, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

It will be understood that, an identification code (e.g., a, b, c, etc.) is used for the convenience of description. The identification code is not intended to describe an order of steps, but the steps may occur in the same order as the specified order or may be performed substantially at the same time or may be performed in opposite order.

The present disclosure may be implemented with a code readable by a computer system in a computer readable recording medium, and the computer readable recording medium includes all types of recording device in which data readable by a computer system. Examples of the computer readable recording medium include ROM, RAM, CD-ROM, magnetic tape, floppy disk, optical data storage device, and the like.

Unless it is contrarily defined, all terms have the same meanings as those generally understood by a person with ordinary skill in the art. Terms which are defined in a generally used dictionary should be interpreted to have the same meaning as the meaning in the context of the related art and are not interpreted as an ideal meaning or excessively formal meanings unless clearly defined in the present application.

FIG. 1 is a diagram illustrating a stereoscopic image generating and playing system according to an embodiment of the present disclosure.

Referring to FIG. 1, a stereoscopic image generating and playing system 100 may include an HMD device 110, a stereoscopic image generating and reconstructing apparatus 130, a database 150 and a controller device 170. In one embodiment, in the stereoscopic image generating and playing system 100, a stereoscopic image generating system and a stereoscopic image playing system may be independently implemented, and in this case, the stereoscopic image generating and reconstructing apparatus 130 may be distinguished to a stereoscopic image generating apparatus and a stereoscopic image playing apparatus, and implemented by being included in each system.

The HMD (Head Mounted Display) device 110 may correspond to a computing device capable of detecting a gaze direction of a user according to a head movement of the user and playing a stereoscopic image in the corresponding gaze direction, and may be implemented as a smartphone, a VR device, or the like. The HMD device 110 may be connected to the stereoscopic image generating and reconstructing apparatus 130 through a network, and a plurality of HMD devices 110 may be simultaneously connected to the stereoscopic image generating and reconstructing apparatus 130. In one embodiment, the HMD device 110 may detect a head movement of a user to detect a gaze direction and transmit the information to the stereoscopic image generating and reconstructing apparatus 130 through a wireless network such as WiFi, 5G, and the like. The HMD device 110 may receive a reconstructed stereoscopic image from the stereoscopic image generating and reconstructing apparatus 130 and play the stereoscopic image.

The stereoscopic image generating and reconstructing apparatus 130 may be implemented as a computer or a server corresponding to a program capable of generating an image in a gaze direction of a user to perform an image compression for wireless transmission and reconstructing and playing the received stereoscopic image. The stereoscopic image generating and reconstructing apparatus 130 may be connected to the HMD device 110 and the controller device 170 with a wired network or a wireless network such as Bluetooth, WiFi, and the like and may communicate with the HMD device 110 and the controller device 170 with a wired network or a wireless network. In one embodiment, the stereoscopic image generating and reconstructing device 130 may store information required for generating and reconstructing a stereoscopic image in conjunction with the database 150. Meanwhile, unlike FIG. 1, the stereoscopic image generating and reconstructing apparatus 130 may include a database 150 therein.

The database 150 may store encoding information related to the stereoscopic image generated by the stereoscopic image generating and reconstructing apparatus 130 and may store rendering information generated in the encoding process of the stereoscopic image, but not limited thereto, and the stereoscopic image generating and reconstructing apparatus 130 may store collected or processed information in various forms in the encoding and decoding process for the stereoscopic image. In one embodiment, the database may include a plurality of partial databases, and each of the partial databases may be integrally managed by a single controller.

The controller device 170 corresponds to a computing device capable of generating and providing an input signal related to a movement of a user and may be implemented with a Controller, a Glove, a VR Vest, and the like. The controller device 170 may be connected to the stereoscopic image generating and reconstructing apparatus 130 through a network, and a plurality of controller devices 170 may be simultaneously connected to the stereoscopic image generating and reconstructing apparatus 130. In one embodiment, the controller device 170 may generate a user input signal by sensing a hand motion, a body position, or the like of a user, and may transmit the information to the stereoscopic image generating and reconstructing apparatus 130 through a wireless network such as WiFi, 5G, and the like.

In one embodiment, unlike FIG. 1, the controller device 170 may connected to the HMD device 110 with each other and transmit an input signal related to a user movement to the HMD device 110, and the HMD device 110 may transmit the information received from the controller device 170 to the stereoscopic image generating and reconstructing apparatus 130.

Figure 2:
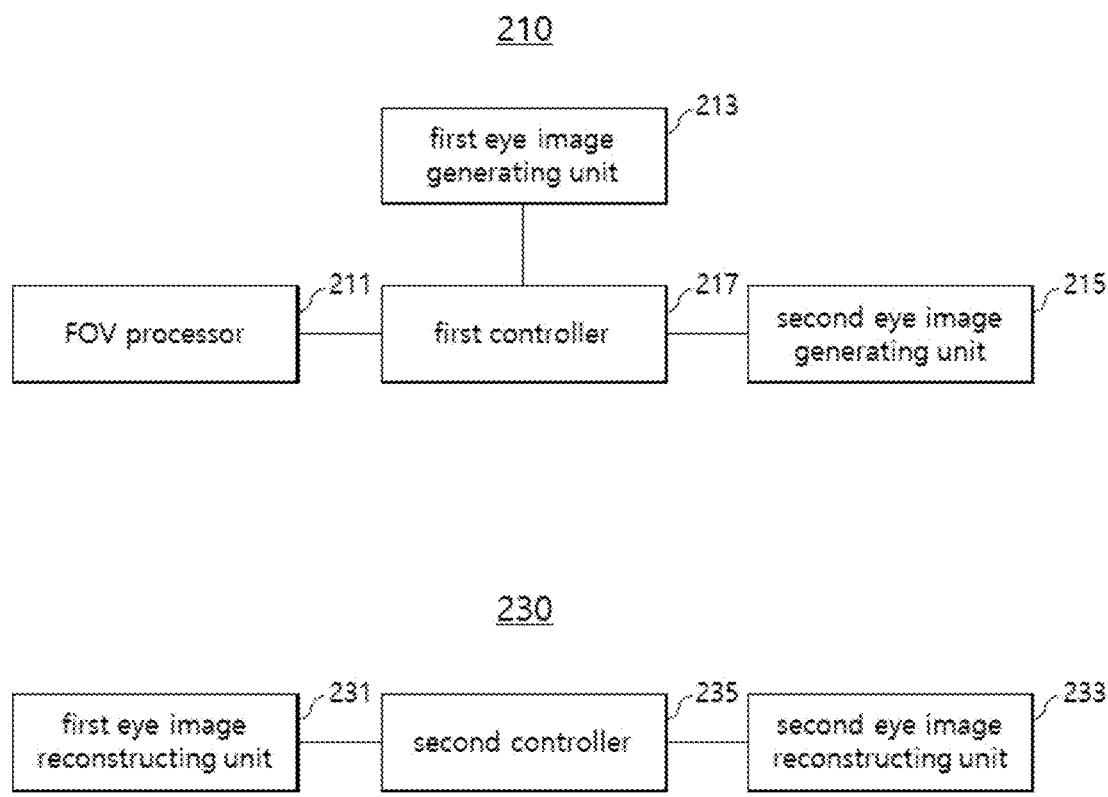
FIG. 2 is a block diagram illustrating a functional configuration of a stereoscopic image generating and reconstructing apparatus according to an embodiment of the present disclosure.

FIG. 2 is a block diagram illustrating a functional configuration of a stereoscopic image generating and reconstructing apparatus according to an embodiment of the present disclosure.

Referring to FIG. 2, a stereoscopic image generating apparatus 210 may include a FOV processor 211, a first eye image generating unit 213, a second eye image generating unit 215 and a first controller 217, and a stereoscopic image reconstructing apparatus 230 may include a first eye image reconstructing unit 231, a second eye image reconstructing unit 233, and a second controller 235.

In one embodiment, the stereoscopic image generating apparatus 210 may receive a signal related to a user input from the HMD device 110 and the controller device 170, generate a stereoscopic image in a gaze direction of the user through graphic rendering, and perform video encoding for wireless transmission after capturing the image.

In one embodiment, the stereoscopic image reconstructing apparatus 230 may receive a stereoscopic image generated and encoded by the stereoscopic image generating apparatus 210 and perform video decoding, and may reconstruct the stereoscopic image according to the gaze direction of the user, and may play the stereoscopic image through the HMD device 110, and may perform image processing to expand or cut the stereoscopic image in accordance of FOV.

The FOV processor 211 may receive head and body directions of a user mounted with the HMD device 110 and the VR Vest device to determine a FOV. More specifically, the FOV processor 211 may receive a signal related to the head direction of the user from the HMD device 110 and may receive a signal related to the body direction of the user from the VR Vest device corresponding to the controller device 170. In addition, the FOV processor 211 may adaptively determine an angle of view (Field of View; FOV) of the user based on the head direction and the body direction of the user. The stereoscopic image generating apparatus 210 may generate the first eye image and the second eye image related to the stereoscopic image based on the angle of view determined by the FOV processor 211.

In one embodiment, the FOV processor 211 may determine a FOV for horizontal and vertical based on an acceleration of the head and body movement of the user. More specifically, in the case of determining a FOV in consideration of the head movement of the user only, the case assumes a state that the body of the user is fixed, and a range of FOV may be more limited than a range of FOV which is determined by considering both the head and the body of the user. Accordingly, the FOV processor 211 may determine a FOV by considering the body movement of the user as well as the head movement, thereby accurately reflecting the dynamic movement of the user. In particular, the FOV processor 211 may determine a horizontal and vertical FOV based on an acceleration of the head and body movements of the user.

In one embodiment, the FOV processor 211 may set 210 degree as a horizontal direction and 130 degree as a vertical direction as a default angle of view (FOV). In addition, the FOV processor 211 may adjust the horizontal angle of view (HFOV) between 210 degree to 360 degree and may adjust the vertical angle of view (VFOV) between 130 degree and 180 degree, and such an angle adjustment may be determined based on the acceleration of the head movement and the Movement of the body. In one embodiment, the FOV processor 211 may include an adaptive FOV selection module and a foveated rendering module.

The first eye image generating unit 213 may include an intra image independently generated for a first eye and an inter image derived from the intra image and generate a redundant image from a center of the head direction of a user to a redundant angle of view greater by a specific criterion or more than a real angle of view which is currently displayed in a direction of the first eye as a plurality of first eye images. Here, the first eye may correspond to a right eye of a user, and a first eye image may be played on the HMD device 110 and may correspond to an image encoded by the first eye image generating unit 213 as a stereoscopic image viewed through the right eye of the user. The first eye image generating unit 213 may sequentially perform Graphics Rendering, Screen Capturing and Video Encoding based on an angle of view determined by the FOV processor 211 to generate a first eye image.

Particularly, the first eye image generating unit 213 may divide an entire image into a frame section of a specific length in the video encoding process and generate an intra image as a reference frame for each frame section. The intra image may correspond to a frame generated using only information about a corresponding frame in encoding or decoding as a frame constituting a stereoscopic image. That is, the intra image may correspond to a reference image having all the information about the corresponding frame. Furthermore, the first eye image generating unit 213 may generate an inter image based on the intra image. The inter image may correspond to a frame generated by encoding information about a difference from a corresponding image only based on an intra image as a frame constituting the stereoscopic image.

In one embodiment, the first eye image generating unit 213 may generate a redundant image from a center of the head direction of a user to a redundant angle of view greater by a specific criterion or more than a real angle of view which is currently displayed in a direction of the first eye as a plurality of first eye images. The first eye image generating unit 213 may generate a first eye image based on an angle of view (or Field of View) determined by the FOV processor 211, and the FOV processor 211 may determine a redundant angle of view greater than a specific reference angle with respect a real angle of view currently displayed on the HMD device 110. That is, the FOV processor 211 may dynamically determine a FOV according to the head and body movements of the user and determine a redundant angle of view greater than a real angle of view viewed by the user as the FOV. Accordingly, the first eye image generating unit 213 may generate the redundant image up to the redundant angle of view greater than the real angle of view as the first eye image based on the angle of view of the FOV.

In one embodiment, the first eye image generating unit 213 may perform Foveated Rendering with respect to the redundant image when the head direction of the user is maintained for a predetermined time or more, thereby increasing the resolution of the real image up to the image angle of view. In the case that the head direction of the user is maintained for a predetermined time or more, it is determined that the user is watching an image in the gaze direction, and the first eye image generating unit 213 may perform Foveated Rendering with respect to the redundant image.

In this case, the Foveated Rendering may correspond to an image processing method of processing a region of interest by a user with high resolution according to a user's gaze and processing a portion other than the corresponding region with a low resolution. The first eye image generating unit 213 may determine whether the user gazes based on a change in the head direction of the user, and accordingly, perform a rendering with high resolution for an actual region that the user gazes and perform a rendering with a low resolution for the remaining region, that is a region other than the actual angle of view in the redundant image. Consequently, the first eye image generating unit 213 may differentially apply the resolution of the real image and the remaining image from the redundant image to the real angle of view and may apply a relatively higher resolution to the real image.

The second eye image generating unit 215 may generate a plurality of second eye images based on the intra image of the plurality of first eye images for the second eye. In this case, the second eye may correspond to the first eye and correspond to the left eye of the user, and the second eye image may be displayed on the HMD device 110 and may correspond to an image encoded by the second eye image generating unit 215 as a stereoscopic image viewed through the left eye of the user. The second eye image generating unit 215 may sequentially perform Foveated Rendering, Screen Capturing and Video Encoding based on an angle of view determined by the FOV processor 211 to generate a second eye image, and this may be proceed in the same way as the process of generating the first eye image.

In one embodiment, the second eye image generating unit 215 may generate a plurality of second eye images including a basic inter image generated from an intra image and an extended inter image derived from the basic inter image among a plurality of first eye images. In particular, the second eye image generating unit 215 may divide an entire image into a frame section of a specific length in the video encoding process and generate a basic inter image as a reference frame for each frame section. The basic inter image may use the corresponding intra image without any change or may be generated based on the corresponding intro image as an image corresponding to the intra image in the process of generating the first eye image. In addition, the second eye image generating unit 215 may generate an expanded inter image based on the basic inter image. The expanded inter image may correspond to a frame generated by encoding only information about a difference from the corresponding image based on the basic inter image as a frame constituting a stereoscopic image.

In one embodiment, the second eye image generating unit 215 may synchronize the intra image with the basic inter image at the same time in a stereoscopic image. The second eye image generating unit 215 may generate a basic inter image for the second eye image using the intra image of the first eye image without any change, and in this case, the first eye image and the second eye image may correspond to the right and the left images, respectively. The second eye image generating unit 215 may synchronize the intra image with the basic inter image at the same viewpoint, thereby providing stereoscopic perception at the corresponding viewpoint.

More specifically, the synchronization at the same time may be performed by calculating an actual angle of view in the second eye direction so as to correspond to an actual angle of view in the first eye direction based on a center of the head direction of a user and applying it to the basic inter image. In other words, the second eye image generating unit 215 may set the intra image of the first eye image as the basic inter image of the second eye image and adjust the intra image to the actual angle of view in the first eye direction to perform synchronization at the same time.

In one embodiment, the second eye image generating unit 215 may generate a difference between an intra image (hereinafter, first intra image) independently generated for a first eye and an intra image (hereinafter, second intra image)

independently generated for a second eye as a basic inter image. The second eye image generating unit 215 may generate a basic inter image related to a second eye image based on the first intra image, and in this case, the basic inter image may be generated based on the difference between the first intra image and the second intra image. Consequently, the second intra image may be generated through a method of generating an inter image based on the difference from the first intra image.

In one embodiment, the first eye image generating unit 213 and the second eye image generating unit 215 may include a user input signal receiving module, a graphic rendering module, a screen capturing module and a video encoding module, respectively. The graphic rendering module may determine an angle of view based on a gaze direction of a user, and the screen capturing module may capture an image in the gaze direction of the user from the image generated by the graphic rendering module. In addition, the video encoding module may perform encoding on a captured image.

The first controller 217 may control overall operations of the stereoscopic image generating apparatus 210 and may manage a control flow or a data flow among the FOV processor 211, the first eye image generating unit 213 and the second eye image generating unit 215.

The first eye image reconstructing unit 231 may sequentially receive a plurality of first eye images including an intra image independently generated for the first eye and an inter image derived from the intra image to reconstruct the first eye image. The second eye image reconstructing unit 233 may sequentially receive a plurality of second eye images including a basic inter image generated based on an intra image among a plurality of the first eye images and an expanded inter image derived from the basic inter image for the second eye to reconstruct the second eye image.

In one embodiment, the first eye image reconstructing unit 231 and the second eye image reconstructing unit 233 may include a stereoscopic image receiving module, a video decoding module and a reconstructed image transmitting module. The stereoscopic image receiving module may receive the stereoscopic image generated by the stereoscopic image generating apparatus 210 through wireless communication, and the video decoding module may decode and reconstruct the received stereoscopic image. In addition, the reconstructed image transmitting module may transmit the stereoscopic image reconstructed by the video decoding module to the HMD device 110, and the HMD device 110 may play the transmitted image to finally deliver the stereoscopic image to a user. In another embodiment, the first eye image reconstructing unit 231 and the second eye image reconstructing unit 233 may be implemented by being included in the HMD device 110, and in this case, the reconstructed image transmitting module for an image transmission to the HMD device 110 may be omitted.

The second controller 235 may control overall operations of the stereoscopic image reconstructing device 230 and may manage a control flow or a data flow between the first eye image reconstructing unit 231 and the second eye image reconstructing unit 233.

Figure 3:
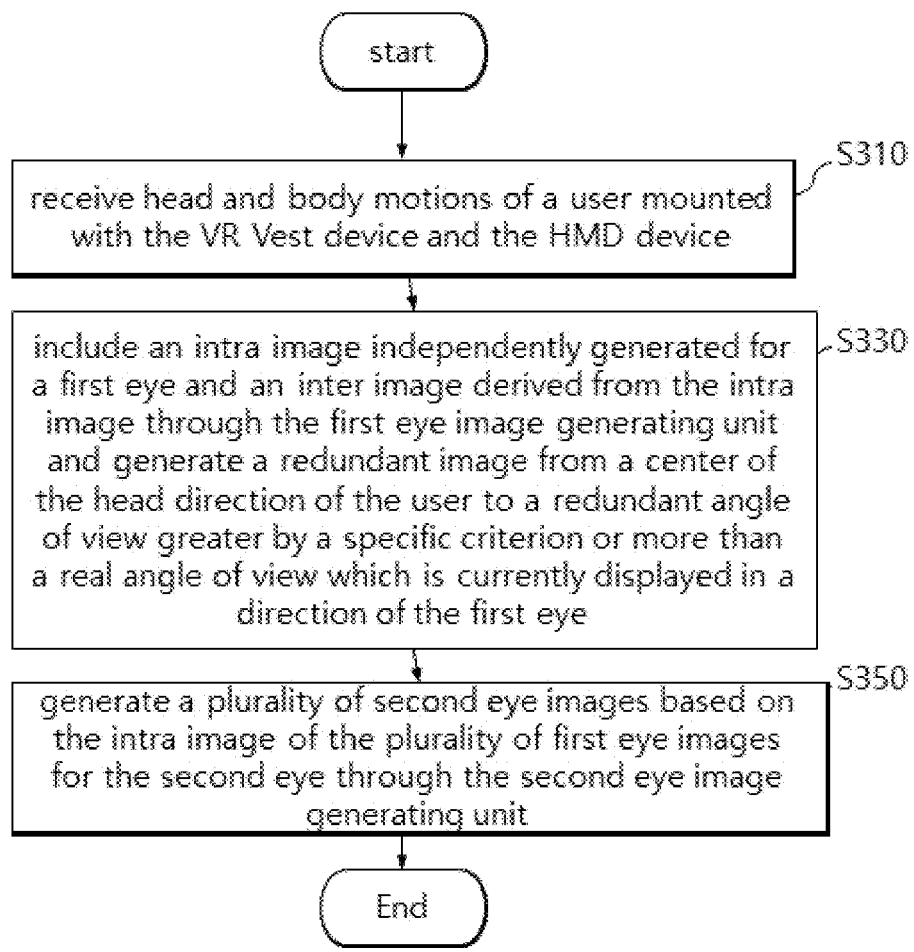
FIG. 3 is a flowchart describing a stereoscopic image generation process performed by a stereoscopic image generating apparatus according to an embodiment of the present disclosure.

FIG. 3 is a flowchart describing a stereoscopic image generation process performed by a stereoscopic image generating apparatus according to an embodiment of the present disclosure.

Referring to FIG. 3, the stereoscopic image generating apparatus 210 may receive head and body motions of a user mounted with the VR Vest device and the HMD device 110 through the FOV processor 211 (step, S310). The stereoscopic image generating apparatus 210 may include an intra image independently generated for a first eye and an inter image derived from the intra image through the first eye image generating unit 213 and generate a redundant image from a center of the head direction of the user to a redundant angle of view greater by a specific criterion or more than a real angle of view which is currently displayed in a direction of the first eye (step, S330). The stereoscopic image generating apparatus 210 may generate a plurality of second eye images based on the intra image of the plurality of first eye images for the second eye through the second eye image generating unit 215 (step, S350).

Figure 4:
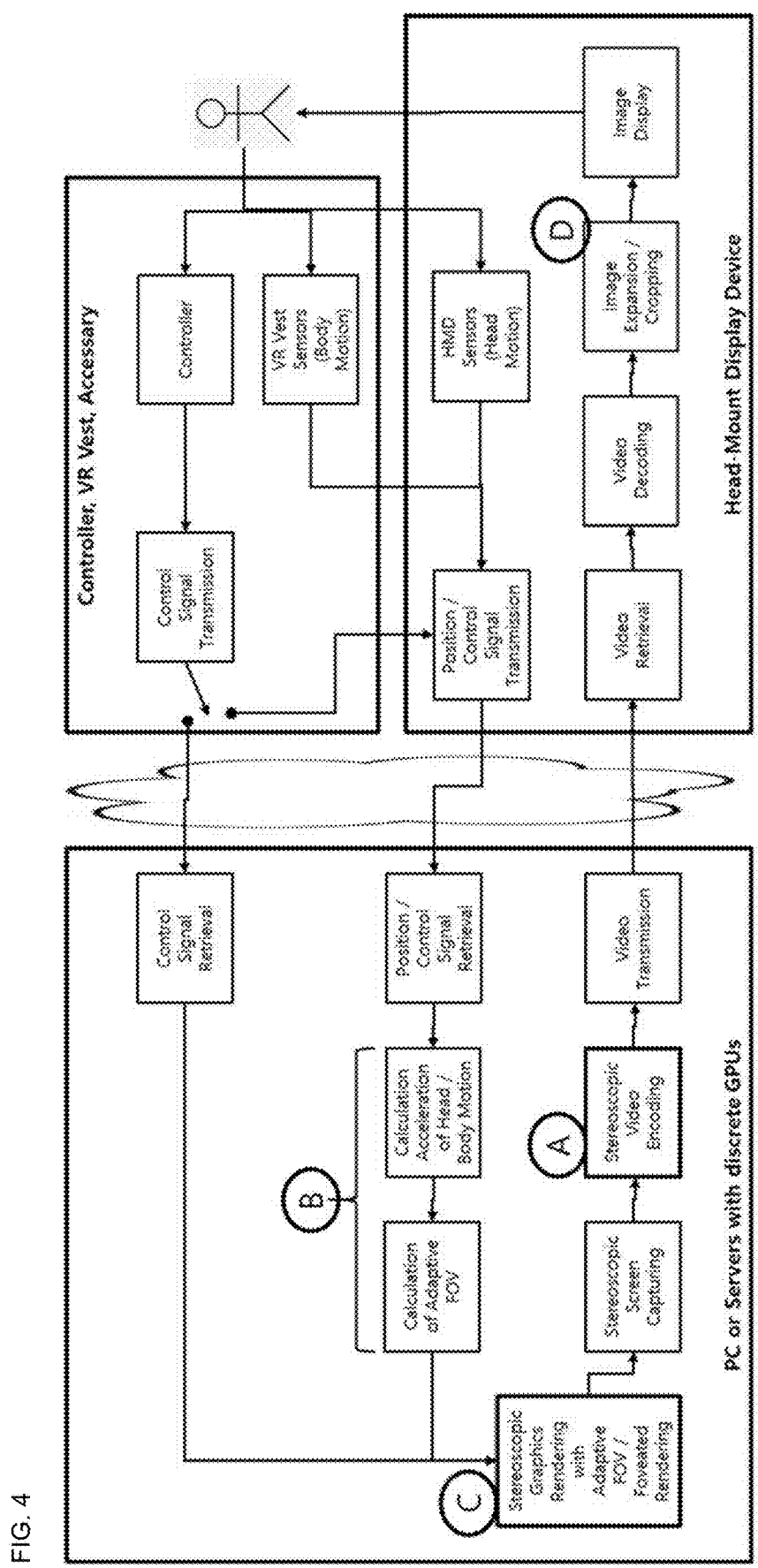
FIG. 4 is a conceptual diagram illustrating an overall configuration of a stereoscopic image generating and reconstructing system according to an embodiment of the present disclosure.

FIG. 4 is a conceptual diagram illustrating an overall configuration of a stereoscopic image generating and reconstructing system according to an embodiment of the present disclosure.

Referring to FIG. 4, the stereoscopic image generating and playing system may reduce encoding of an unnecessary image and reduce data transmitted over a wireless network to reduce an overlap of stereoscopic images and reduce delay. The stereoscopic image generating and reproducing system may include a controller wearable on a body of a user, a controller device such as a VR Vest and an Accessary, an HMD device capable of playing stereoscopic images and a stereoscopic image generating apparatus for rendering and encoding stereoscopic images. In one embodiment, the controller device may be connected to the HMD device to transmit a motion signal of the user, and the HMD device may transmit a motion signal including a head movement of the user to the stereoscopic image generating apparatus, and the stereoscopic image generating apparatus may include an independent GPU performing graphic rendering, screen capturing and video encoding.

The stereoscopic image generating apparatus may dynamically determine a FOV based on a user motion signal (step B) and perform graphic rendering and Foveated Rendering based on the FOV (step C). In addition, the stereoscopic image generating apparatus may perform video encoding after screen capture (step A). The encoded data generated by the stereoscopic image generating apparatus may be transmitted to the HMD device capable of playing a stereoscopic image through a wireless network, and the HMD device may decode data encoded through the stereoscopic image reconstructing device implemented inside of the HMD device, expand or cut the image according to the actual display size (step D), and then, play the stereoscopic image through a display panel.

Figure 5:
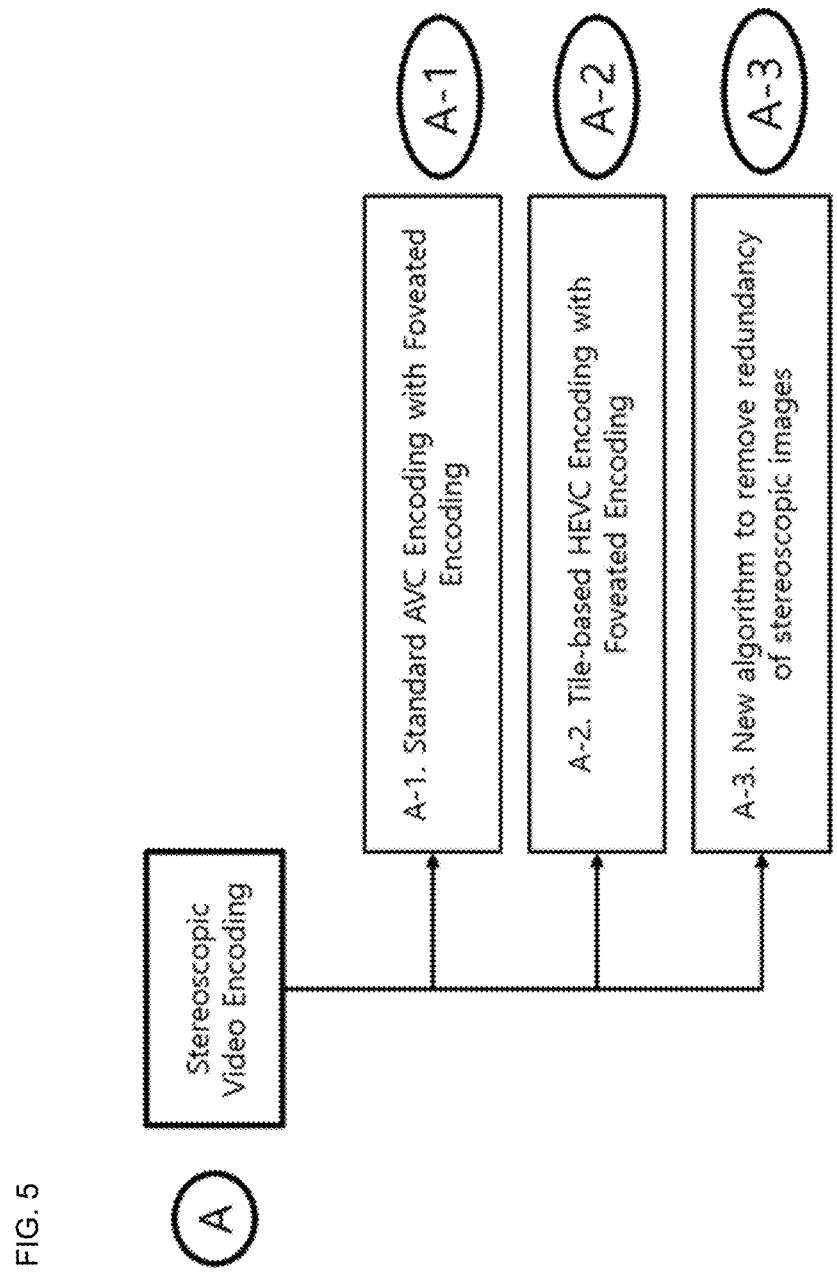
FIG. 5 is an exemplary diagram illustrating an encoding method used in the stereoscopic image encoding process by the stereoscopic image generating apparatus shown in FIG. 4.

FIG. 5 is an exemplary diagram illustrating an encoding method used in the stereoscopic image encoding process by the stereoscopic image generating apparatus shown in FIG. 4.

Referring to FIG. 5, the stereoscopic image generating apparatus may perform video encoding on an image generated through graphic rendering and perform three types of encoding largely. First, standard Advanced Video Coding (AVC) encoding may be performed, and Foveated Encoding may be performed by performing based on a foveated image. Second, tile-based High Efficiency Video Coding encoding may be performed, and Foveated Encoding may be performed by performing based on a foveated image. Third, encoding in which a redundancy for a stereoscopic image is removed may be performed. That is, the whole 360-degree image around a user is not encoded, but according to the FOV dynamically determined based on head and body movements of a user, only a redundant image including the FOV is generated through graphic rendering and encoded, thereby reducing the amount of data transmitted over a wireless network.

Figure 6:
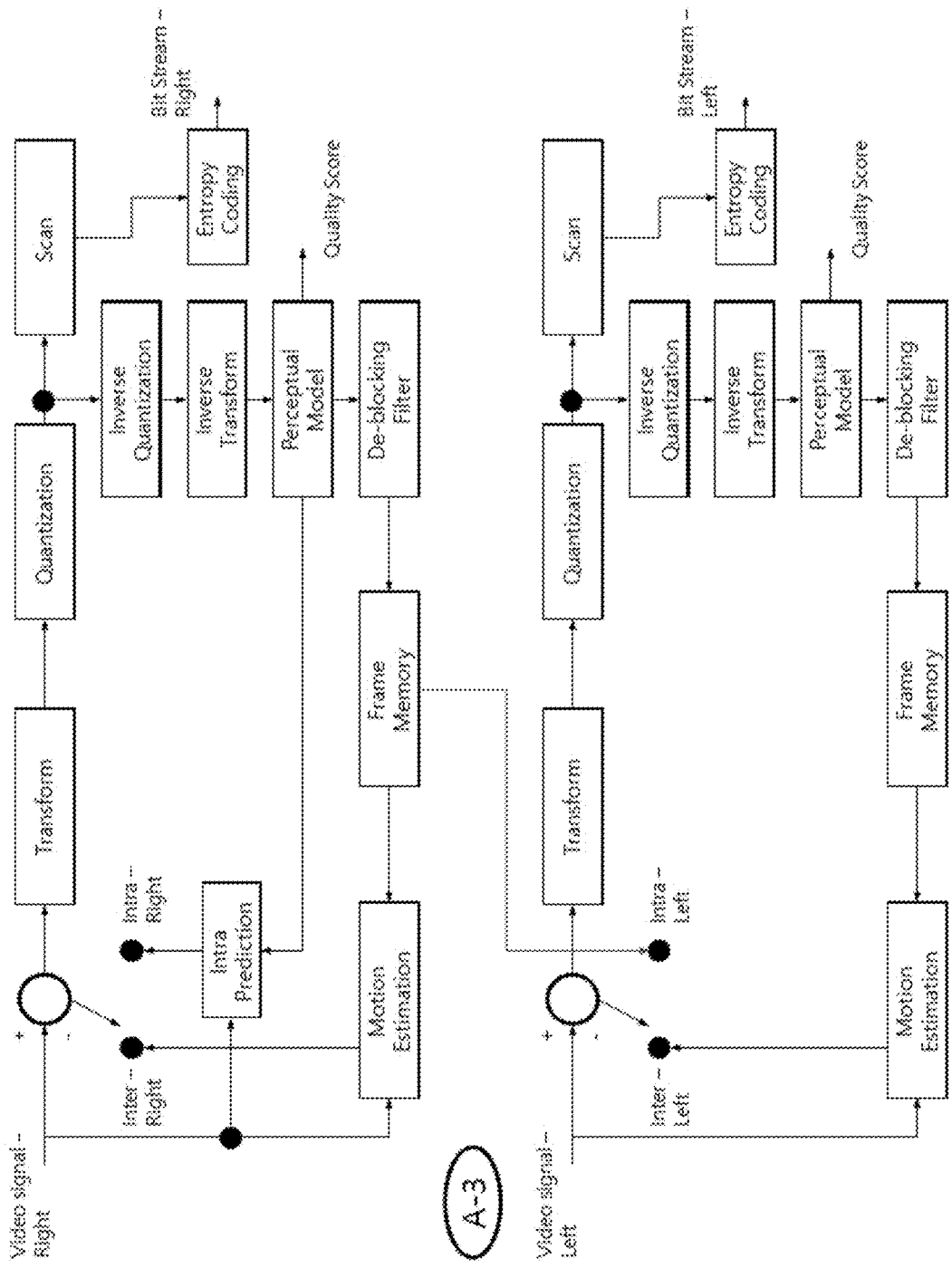
FIG. 6 is an exemplary diagram illustrating an encoding process for a binocular image performed by a stereoscopic image generating and reconstructing apparatus according to an embodiment of the present disclosure.

FIG. 6 is an exemplary diagram illustrating an encoding process for a binocular image performed by a stereoscopic image generating and reconstructing apparatus according to an embodiment of the present disclosure.

Referring to FIG. 6, the stereoscopic image generating apparatus 210 may perform encoding on a binocular image viewed through right and left eyes. In one embodiment, the stereoscopic image generating apparatus 210 may divide a single image into a plurality of blocks to process a generation process in units of blocks. For example, a block as a unit process may correspond to any one of a Prediction Unit (PU), a Transform Unit (TU) and a Coding Unit (CU). A single image may be divided into a plurality of Coding Tree Units (CTUs), and each coding tree unit forms Quad Tree structure and may be divided into a plurality CUs. In addition, a PU and a TU may be derived from a CU.

An intra prediction step may generate an intra image including a prediction block by performing prediction for each unit of process block of an image. In this case, a unit of processing and a prediction method for which a prediction is performed may vary according to prediction conditions. The intra prediction may perform a prediction based on only pixel information in a frame corresponding to a current image. The Motion Estimation step may generate an inter image including a prediction block by performing prediction for each unit of processing block of an image. The motion estimation may perform a prediction based on at least one information of a previous frame or a subsequent frame of the current image.

A transform step may generate a transform block of transform coefficients by transform. A Quantization step may quantize the transform coefficients for the transformed blocks to generate quantized transform coefficients. A Scan step may rearrange the quantized transform coefficients to increase encoding efficiency in the entropy coding step. In addition, the scan step may rearrange the quantized transform coefficients of 2-dimensional block form to 1-dimensional vector form through coefficient scanning. An Entropy Coding step may perform entropy coding of the rearranged quantized transform values and output a bitstream. An inverse quantization step may dequantize the values quantized in the quantization step. An inverse transform step may perform inverse transform of the inverse-quantized values in the inverse quantization step.

A De-blocking Filter step may remove a distortion generated at a boundary between blocks in a reconstructed image. A Frame Memory step may store an image or frame derived from the de-blocking filter step, and the image or frame stored in a memory may be provided to a motion estimation step. In one embodiment, during the process of generating a first eye image, the intra image (or frame) stored in the memory in the frame memory step may be provided as a basic inter image for generating a second eye image. That is, the second eye image may be generated using the intra image in the generation of the first eye image as the basic inter image. Accordingly, the basic inter image for generating the second eye image may be used instead of the intra image.

Furthermore, in the stereoscopic image generating apparatus 230 according to an embodiment of the present disclosure, in the case that an image bitstream is input from the stereoscopic image reconstructing apparatus 210, the input bitstream may be decoded according to the process in which image information performed in the stereoscopic image reconstructing apparatus 210 is processed.

Figure 7:
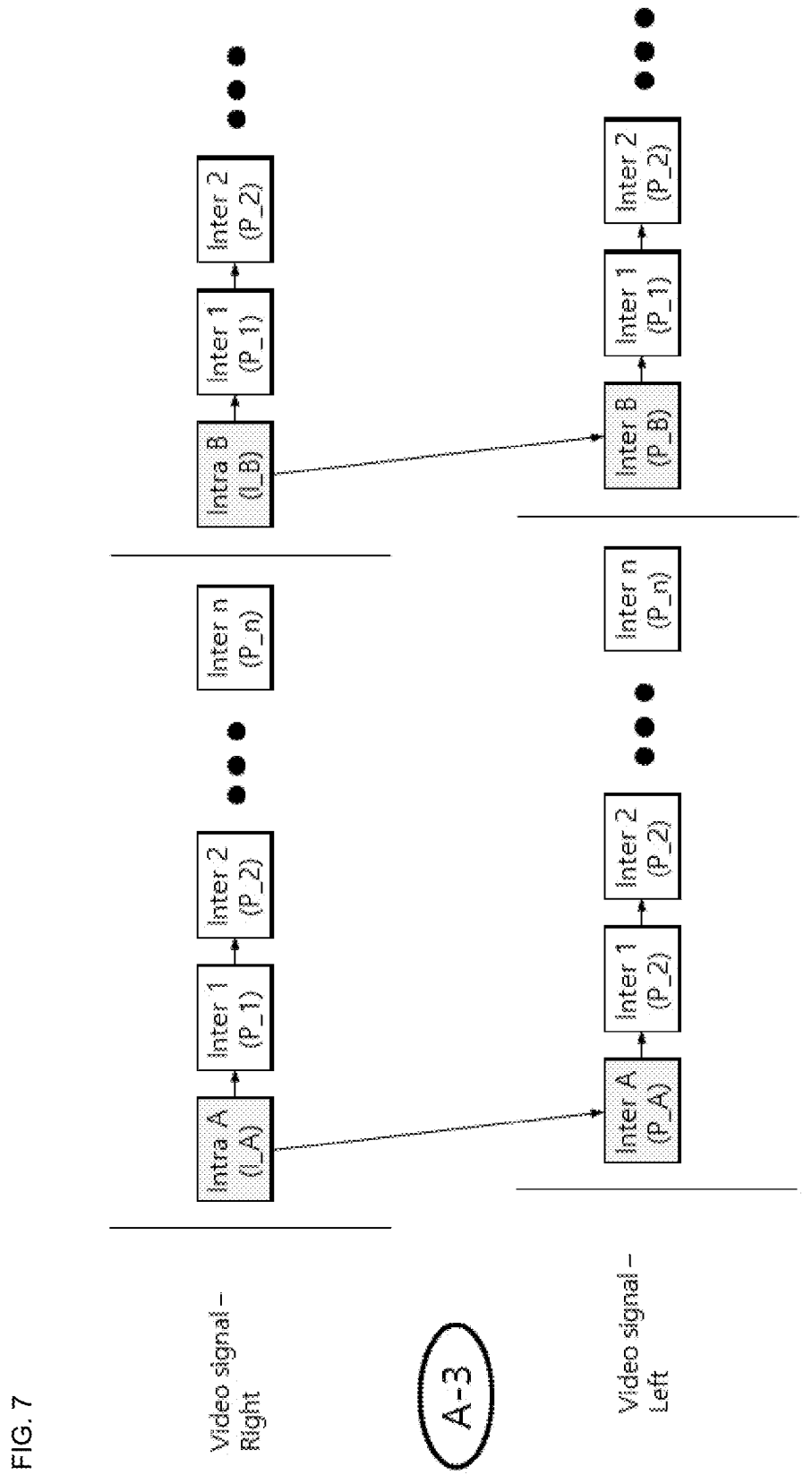
FIG. 7 is a flowchart illustrating a process of generating intra and inter images performed by a stereoscopic image generating apparatus according to an embodiment of the present disclosure.

FIG. 7 is a flowchart illustrating a process of generating intra and inter images performed by a stereoscopic image generating apparatus according to an embodiment of the present disclosure.

Referring to FIG. 7, the stereoscopic image generating apparatus 210 may generate a first eye image through the first eye image generating unit 213 and generate a second eye image through the second eye image generating unit 215. The first eye image may correspond to an image viewed through a right eye of a user, and the second eye image may correspond to an image viewed through a left eye of the user. Both the first and second eye images may include a series of inter images generated based on an intra image (or frame). However, the intra image in the second eye image may be generated based on the intra image in the first eye image generation. In one embodiment, the basic inter image of the second eye image may be generated using the intra image of the first eye image without any change, and in another embodiment, the basic inter image of the second eye image may be generated based on a difference between the intra image of the first eye image and the intra image of the second eye image. The first and second eye images may be divided into a plurality of frame sections, and each frame section may include a single intra image (or frame) and a plurality of inter images generated based on based on it.

Figure 8:
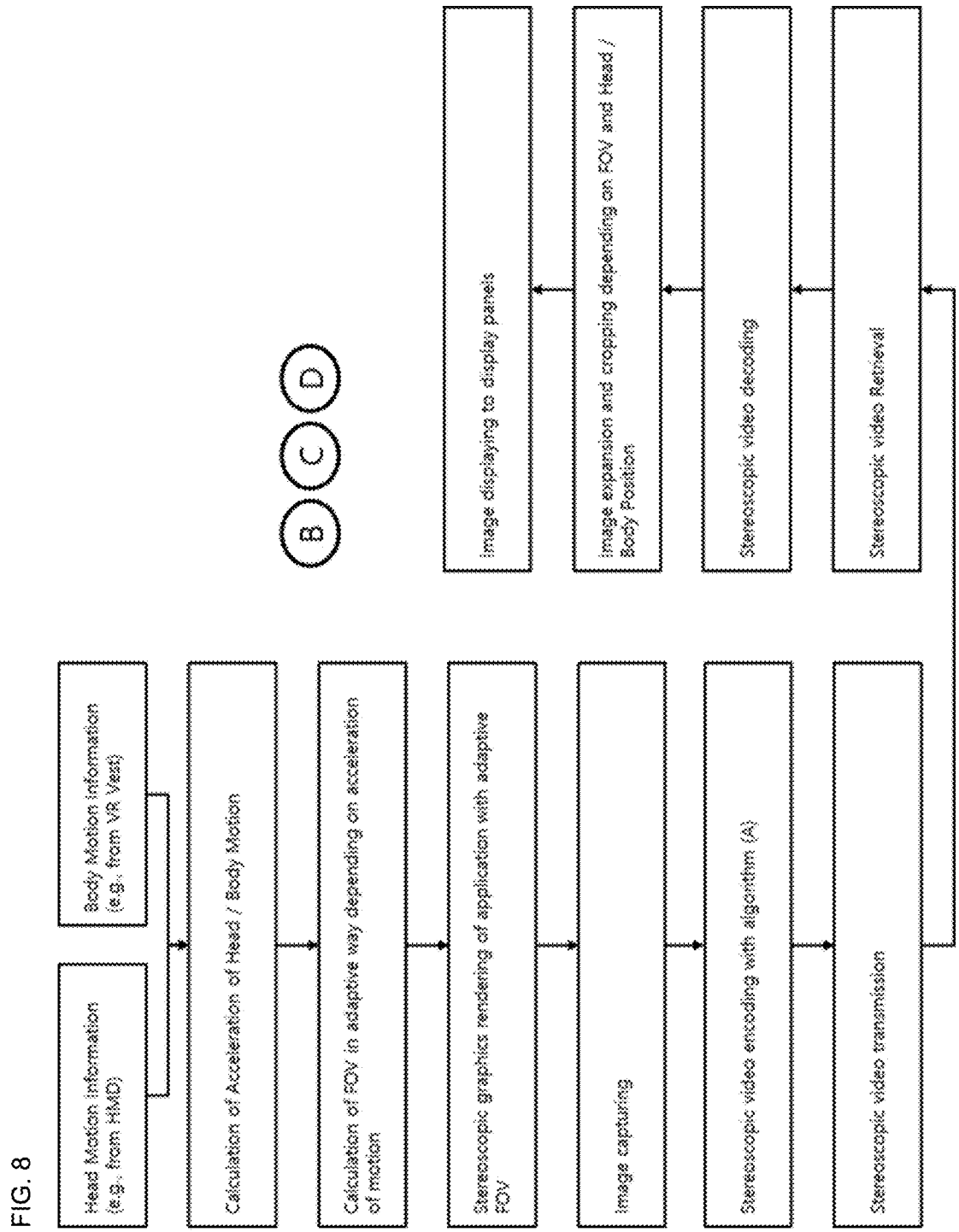
FIG. 8 is an exemplary diagram illustrating a process of generating and reconstructing a stereoscopic image performed in a stereoscopic image generating and reconstructing apparatus according to an embodiment of the present disclosure.

FIG. 8 is an exemplary diagram illustrating a process of generating and reconstructing a stereoscopic image performed in a stereoscopic image generating and reconstructing apparatus according to an embodiment of the present disclosure.

Referring to FIG. 8, the HMD device 110 or the controller device 170 may generate a user input signal, and the stereoscopic image generating apparatus 210 may receive the user input signal and calculate an acceleration of the movement of head and body of the user. The stereoscopic image generating apparatus 210 may dynamically calculate a FOV of the user based on acceleration of the movement of head and body of the user through the FOV processor 211. In addition, the stereoscopic image generating apparatus 210 may perform Graphic rendering based on the calculated FOV. The graphic rendering may include an Adaptive FOV Selection step and a Foveated Rendering step. The adaptive FOV selection step may dynamically determine an angle of view based on the head movement acceleration and the body movement acceleration within a specific range based on a basic configuration angle. The Foveated Rendering step may perform an image processing for a region in which the user is looking with high resolution and the other region with low resolution based on the angle of view of the user.

In addition, the stereoscopic image generating apparatus 210 may perform an image capturing for capturing the rendered image. The stereoscopic image generating apparatus 210 may generate image data to be wirelessly transmitted through video encoding. The video encoding may be performed according to an existing standard Advanced Video Coding or High Efficiency Video Coding for generating the first eye and the second eye images and may be performed according to an encoding according to an embodiment of the present disclosure. The encoding data generated by the stereoscopic image generating apparatus 210 may be transmitted to the stereoscopic image reconstructing apparatus 230 through wireless communication.

The stereoscopic image reconstructing apparatus 230 may perform video decoding using the encoded data received from the stereoscopic image generating apparatus 210. The stereoscopic image reconstructing apparatus 230 may reconstruct the image encoded through video decoding. Here, the video decoding may be performed in a similar manner to the video encoding, and the stereoscopic image reconstructed by the stereoscopic image reconstructing apparatus 230 may be played through the HMD device 110. In one embodiment, the stereoscopic image reconstructing apparatus 230 may generate and play a stereoscopic image according to the FOV determined based on the head and body movements of the user. For example, the stereoscopic image reconstructing apparatus 230 may expand or cut the image to suit an angle of view of the user which is displayed and then play the image through the HMD device 110.

Figure 9:
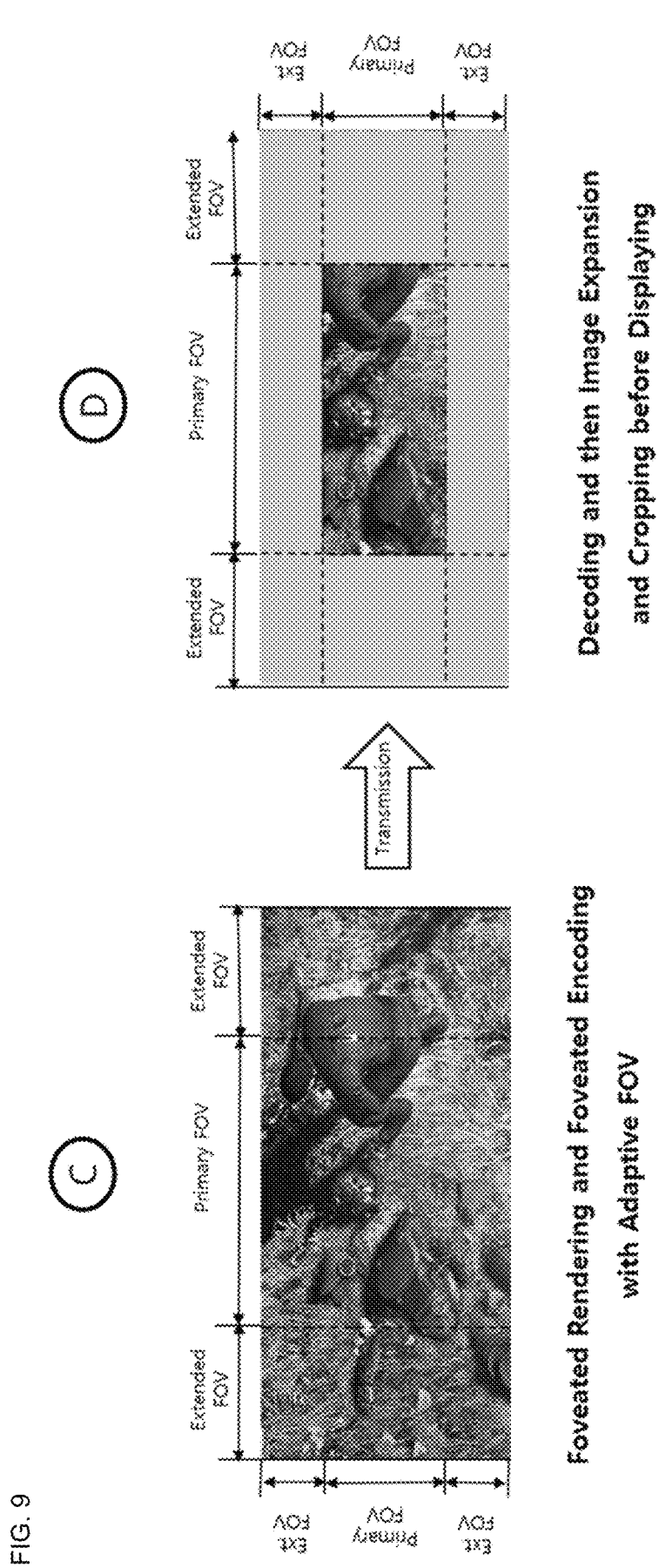
FIG. 9 is an exemplary diagram illustrating a process of generating and reconstructing a stereoscopic image performed in a stereoscopic image generating and reconstructing apparatus according to an embodiment of the present disclosure.

FIG. 9 is an exemplary diagram illustrating a process of generating and reconstructing a stereoscopic image performed in a stereoscopic image generating and reconstructing apparatus according to an embodiment of the present disclosure.

Referring to FIG. 9, the stereoscopic image generating apparatus 210 may determine a FOV based on a signal for a movement of a user received from the HMD device 110 and the controller device 170 and dynamically determine a Primary FOV and an Extended FOV based on the FOV. The stereoscopic image generating apparatus 210 may perform rendering of a stereoscopic image according to the FOV determined by the FOV processor 211, generate a Foveated image by performing an image Foveation to generate a Foveated image and perform Foveated Encoding by encoding the image.

The stereoscopic image generating apparatus 210 may transmit the encoded data, and the stereoscopic image reconstructing apparatus 230 may receive the data and play the data through a display apparatus after decoding. In one embodiment, the stereoscopic image reconstructing apparatus 230 may be implemented by being included in the HMD device 110. The stereoscopic image reconstructing apparatus 230 may expand or cut an image in accordance with a screen size of the display apparatus after decoding the encoded data. Furthermore, the stereoscopic image reconstructing apparatus 230 may determine a position to be played in the encoded data based on the movement of the head and the body of the user and reconstruct and play the image at the position.

So far, the present disclosure is described with reference to a preferred embodiment, but it will be apparent to those skilled in the art that various modifications and variations may be made in the present disclosure without departing from the spirit or scope of the disclosure.

The disclosed technology may have the following effects. However, this does not mean that a specific embodiment should include all the following effects or include only the following effects, and accordingly, it should not be understood that the scope of the disclosed technology is limited thereby.

A stereoscopic image generating apparatus, a stereoscopic image reconstructing apparatus, and a stereoscopic image playing system including the same according to an embodiment of the present disclosure may effectively reduce data transmitted through wireless communication by utilizing an intra image of a right image as a basic inter image generation of a left image.

A stereoscopic image generating apparatus, a stereoscopic image reconstructing apparatus, and a stereoscopic image playback system including the same according to an embodiment of the present disclosure may synchronize an intra picture of a right image with a basic inter picture of a left image at the same time.

DESCRIPTION OF REFERENCE NUMERALS

100: Stereoscopic image generating and playing system
110: HMD device 130: stereoscopic image generating and reconstructing apparatus
150: Database 170: controller device
210: Stereoscopic image generating apparatus
211: FOV processor 213: first eye image generating unit
215: Second eye image generating unit 217: first controller
230: Stereoscopic image reconstructing apparatus
231: First eye image reconstructing unit 233: second eye image reconstructing unit
235: Second controller

What is claimed is:

1. A stereoscopic image generating apparatus, comprising:
    a Field of View (FOV) processor configured to receive head and body movements of a user mounted with a Head Mount Display (HMD) device and a Virtual Reality (VR) Vest device;
    a first eye image generating unit including an intra image independently generated for a first eye and an inter image derived from the intra image and configured to generate a redundant image up to a redundant angle of view greater by a specific criterion or more than a real angle of view which is currently displayed in a direction of the first eye from a center of the head direction of a user as a plurality of first eye images; and
    a second eye image generating unit configured to generate a plurality of second eye images based on the intra image among the plurality of first eye images for the second eye.

2. The stereoscopic image generating apparatus of claim 1, wherein the FOV processor determines the FOV related to horizontal and vertical based on an acceleration of the head and body movements of the user.

3. The stereoscopic image generating apparatus of claim 1, wherein the second eye image generating unit generates a plurality of second eye images including a basic inter image generated based on the intra image and an expanded inter image derived from the basic inter image.

4. The stereoscopic image generating apparatus of claim 3, wherein the first eye image generating unit performs Foveated Rendering for the redundant image and increases a resolution for a real image up to the actual angle of view, when a head direction of the user is maintained for a predetermined time or more.

5. The stereoscopic image generating apparatus of claim 1, wherein the second eye image generating unit synchronizes the intra image and the basic inter image on a same time in a stereoscopic image.

6. The stereoscopic image generating apparatus of claim 5, wherein the second eye image generating unit generates a difference between an intra image (hereinafter, first intra image) independently generated for the first eye and an intra image (hereinafter, second intra image) independently generated for the second eye as the basic inter image.

7. A stereoscopic image reconstructing apparatus, comprising:
    a first eye image reconstructing unit configured to sequentially receive a plurality of first eye images including an intra image independently generated for a first eye and an inter image derived from the intra image to reconstruct the first eye image; and
    a second eye image reconstructing unit configured to sequentially receive a plurality of second eye images including a basic inter image generated based on the intra image among the plurality of the first eye images and an expanded inter image derived from the basic inter image for the second eye to reconstruct the second eye image.

8. A stereoscopic image playing system, comprising:

a stereoscopic image reconstructing apparatus including a first eye image reconstructing unit configured to sequentially receive a plurality of first eye images including an intra image independently generated for a first eye and an inter image derived from the intra image to reconstruct the first eye image and a second eye image reconstructing unit configured to sequentially receive a plurality of second eye images including a basic inter image generated based on the intra image among the plurality of the first eye images and an expanded inter image derived from the basic inter image for the second eye to reconstruct the second eye image; and a Head Mount Display (HMD) device configured to receive the plurality of first and second eye images and display the stereoscopic image.

\* \* \* \* \*